US010546162B1

(12) United States Patent
Diorio

(10) Patent No.: US 10,546,162 B1
(45) Date of Patent: Jan. 28, 2020

(54) USER-FILTERED RFID INVENTORY

(71) Applicant: Impinj, Inc., Seattle, WA (US)

(72) Inventor: Christopher J. Diorio, Shoreline, WA (US)

(73) Assignee: Impinj, Inc., Seattle, WA (US)

( * ) Notice: Subject to any disclaimer, the term of this patent is extended or adjusted under 35 U.S.C. 154(b) by 0 days.

(21) Appl. No.: 16/397,116

(22) Filed: Apr. 29, 2019

Related U.S. Application Data

(63) Continuation-in-part of application No. 15/710,814, filed on Sep. 20, 2017, now abandoned.

(60) Provisional application No. 62/398,295, filed on Sep. 22, 2016.

(51) Int. Cl.
*G06K 7/10* (2006.01)
*G06Q 10/08* (2012.01)
*H04W 4/35* (2018.01)

(52) U.S. Cl.
CPC ..... *G06K 7/10108* (2013.01); *G06K 7/10445* (2013.01); *G06Q 10/087* (2013.01); *H04W 4/35* (2018.02)

(58) Field of Classification Search
CPC ............. G06Q 10/087; G06Q 7/10366; G06Q 19/0723
USPC .................................................. 235/385, 492
See application file for complete search history.

(56) References Cited

U.S. PATENT DOCUMENTS

| 7,916,175 | B2* | 3/2011 | Yamakita | G06K 1/18 348/207.99 |
|---|---|---|---|---|
| 9,213,960 | B2* | 12/2015 | Vargas | G06K 17/0022 |
| 9,734,367 | B1* | 8/2017 | Lecky | G06Q 10/0875 |
| 2006/0197838 | A1* | 9/2006 | Yamakita | G06K 1/18 348/169 |
| 2007/0080785 | A1* | 4/2007 | Son | G06K 7/10079 340/10.1 |
| 2009/0037244 | A1* | 2/2009 | Pemberton | G06Q 10/087 705/28 |
| 2015/0001293 | A1* | 1/2015 | Vargas | G06K 17/0022 235/385 |
| 2016/0098427 | A1* | 4/2016 | Vargas | G06K 17/0022 707/769 |
| 2016/0146934 | A1* | 5/2016 | Chawla | G01S 13/74 342/458 |
| 2017/0293784 | A1* | 10/2017 | Vargas | G06K 17/0022 |

* cited by examiner

*Primary Examiner* — Paultep Savusdiphol
(74) *Attorney, Agent, or Firm* — Hertzberg, Turk & Associates, LLC

(57) ABSTRACT

RFID-tagged items can be filtered based on relevance estimation or user input. A device reads digital identifiers for multiple RFID-tagged items. The device estimates and selects an item that an individual desires based on one or more metrics, then presents data about the selected item to the individual. If the device receives feedback that the selected item is not the desired item, then the device may estimate and select another item and/or present information about multiple items to allow the individual to select the desired item. When the desired item is selected, the device may perform some associated action.

20 Claims, 8 Drawing Sheets

USER-FILTERED RFID INVENTORY

CROSS REFERENCE TO RELATED APPLICATIONS

This application is a continuation-in-part of U.S. patent application Ser. No. 15/710,814 filed on Sep. 20, 2017, which in turn claims the benefit of U.S. Provisional Patent Application Ser. No. 62/398,295 filed on Sep. 22, 2016. The disclosures of the above applications are hereby incorporated by reference for all purposes.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package. The RFID tag typically includes, or is, a radio-frequency (RF) integrated circuit (IC).

In principle, RFID techniques entail using an RFID reader to inventory one or more RFID tags, where inventorying involves singulating a tag, receiving an identifier from a tag, and/or acknowledging a received identifier (e.g., by transmitting an acknowledge command). "Singulated" is defined as a reader singling-out one tag, potentially from among multiple tags, for a reader-tag dialog. "Identifier" is defined as a number identifying the tag or the item to which the tag is attached, such as a tag identifier (TID), electronic product code (EPC), etc. An "inventory round" is defined as a reader staging RFID tags for successive inventorying. The reader transmitting a Radio-Frequency (RF) wave performs the inventory. The RF wave is typically electromagnetic, at least in the far field. The RF wave can also be predominantly electric or magnetic in the near or transitional near field. The RF wave may encode one or more commands that instruct the tags to perform one or more actions. The operation of an RFID reader sending commands to an RFID tag is sometimes known as the reader "interrogating" the tag.

In typical RFID systems, an RFID reader transmits a modulated RF inventory signal (a command), receives a tag reply, and transmits an RF acknowledgement signal responsive to the tag reply. A tag that replies to the interrogating RF wave does so by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on. Accordingly, when a reader receives tag data it can learn about the item that hosts the tag and/or about the tag itself.

An RFID tag typically includes an antenna section, a radio section, a power-management section, and frequently a logical section, a memory, or both. In some RFID tags the power-management section includes an energy storage device such as a battery. RFID tags with an energy storage device are known as battery-assisted, semi-active, or active tags. Other RFID tags can be powered solely by the RF signal they receive. Such RFID tags do not include an energy storage device and are called passive tags. Of course, even passive tags typically include temporary energy- and data/flag-storage elements such as capacitors or inductors.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to discriminating between different RFID-tagged items based on user input. A device reads digital identifiers for multiple RFID-tagged items. The device estimates and selects an item that an individual desires based on one or more metrics, then presents data about the selected item to the individual. If the device receives feedback that the selected item is not the desired item, then the device may estimate and select another item and/or present information about multiple items to allow the individual to select the desired item. When the desired item is selected, the device may perform some associated action.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which.

DETAILED DESCRIPTION

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar volatile and nonvolatile information-storage technologies. Some portions of memory may be writeable and some not. "Instruction" refers to a request to a tag to perform a single explicit action (e.g., write data into memory). "Command" refers to a reader request for one or more tags to perform one or more actions, and includes one or more tag instructions preceded by a command identifier or command code that identifies the command and/or the tag instructions. "Program" refers to a request to a tag to perform a set or sequence of instructions (e.g., read a value from memory and, if the read value is less than a threshold then lock a memory word). "Protocol" refers to an industry standard for communications between a reader and a tag (and vice versa), such as the Class-1 Generation-2 UHF RFID Protocol for Communications at 860 MHz-960 MHz by GS1 EPCglobal, Inc. ("Gen2 Protocol"), versions 1.2.0 and 2.0 of which are hereby incorporated by reference. A protocol specifies, in part, symbol encodings, and may include a set of modulations, rates, timings, or any other parameter associated with data communications. In addition, a protocol can be a variant of a particular specification such as the Gen2 Protocol, for example including fewer or additional commands than the particular specification calls for, and so on. In such instances, additional commands are sometimes called custom commands.

Adoption of RFID systems, which can be used to track, locate, and connect everyday items, is rapidly increasing. As the number of RFID-tagged items grows, discriminating between different RFID-tagged items becomes more complex. For example, RFID systems use RF waves to interact with RFID-tagged items. RF wave propagation in real-world environments may be difficult or cumbersome to control or predict, for example, due to the presence of physical obstacles and other RF interferers or radios. As a result, when a device attempts to read the digital identifier of a particular RFID-tagged item, the device may also inadvertently read the digital identifiers of other, nearby RFID-tagged items.

Figure 1:
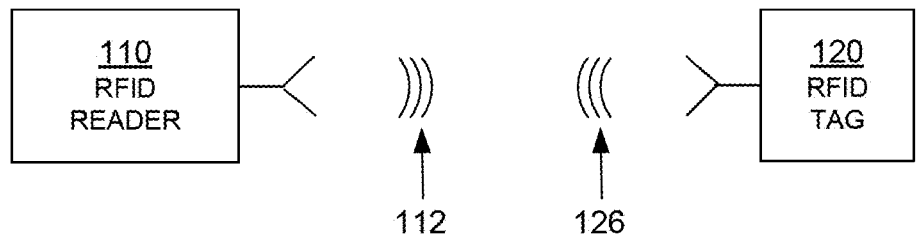
FIG. 1 is a block diagram of components of an RFID system.

FIG. 1 is a diagram of the components of a typical RFID system 100, incorporating embodiments. An RFID reader 110 and a nearby RFID tag 120 communicate via RF signals 112 and 126. When sending data to tag 120, reader 110 may generate RF signal 112 by encoding the data, modulating an RF waveform with the encoded data, and transmitting the modulated RF waveform as RF signal 112. In turn, tag 120 may receive RF signal 112, demodulate encoded data from RF signal 112, and decode the encoded data. Similarly, when sending data to reader 110 tag 120 may generate RF signal 126 by encoding the data, modulating an RF waveform with the encoded data, and causing the modulated RF waveform to be sent as RF signal 126. The data sent between reader 110 and tag 120 may be represented by symbols, also known as RFID symbols. A symbol may be a delimiter, a calibration value, or implemented to represent binary data, such as "0" and "1", if desired. Upon processing by reader 110 and tag 120, symbols may be treated as values, numbers, or any other suitable data representations.

The RF waveforms transmitted by reader 110 and/or tag 120 may be in a suitable range of frequencies, such as those near 900 MHz, 13.56 MHz, or similar. In some embodiments, RF signals 112 and/or 126 may include non-propagating RF signals, such as reactive near-field signals or similar. RFID tag 120 may be active or battery-assisted (i.e., possessing its own power source), or passive. In the latter case, RFID tag 120 may harvest power from RF signal 112.

Figure 2:
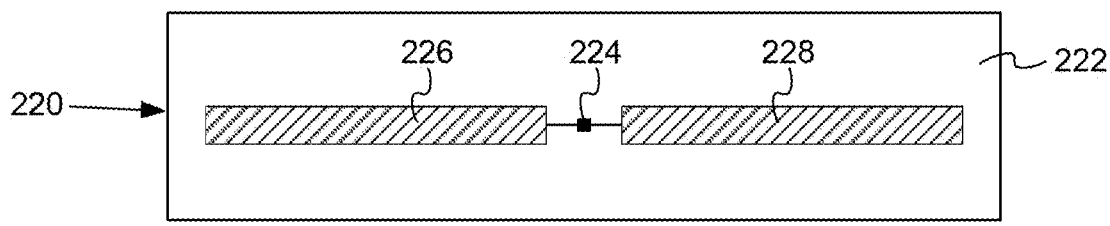
FIG. 2 is a diagram showing components of a passive RFID tag, such as a tag that can be used in the system of FIG. 1.
Figure 2:
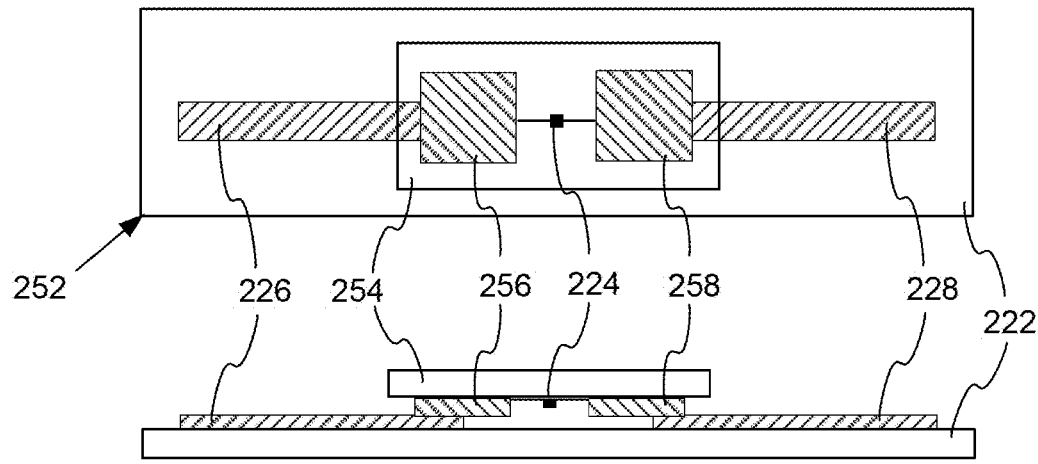
Figure 2:
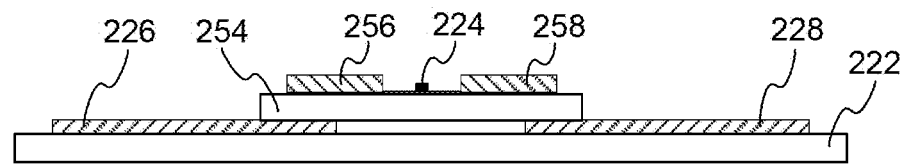

FIG. 2 is a diagram of an RFID tag 220, which may function as tag 120 of FIG. 1. Tag 220 may be formed on a substantially planar inlay 222, which can be made in any suitable way. Tag 220 includes a circuit which may be implemented as an IC 224. In some embodiments IC 224 is fabricated in complementary metal-oxide semiconductor (CMOS) technology. In other embodiments IC 224 may be fabricated in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for transmitting and/or interacting with RF signals. In some embodiments the antenna can be etched, deposited, and/or printed metal on inlay 222; conductive thread formed with or without substrate 222; nonmetallic conductive (such as graphene) patterning on substrate 222; a first antenna coupled inductively, capacitively, or galvanically to a second antenna; or can be fabricated in myriad other ways that exist for forming antennas to receive RF waves. In some embodiments the antenna may even be formed in IC 224. Regardless of the antenna type, IC 224 is electrically coupled to the antenna via suitable IC contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the terms "electrically isolated" or "electrically decoupled" as used herein mean that electrical coupling of one or more types (e.g., galvanic, capacitive, and/or inductive) is not present, at least to the extent possible. For example, elements that are electrically isolated from each other are galvanically isolated from each other, capacitively isolated from each other, and/or inductively isolated from each other. Of course, electrically isolated components will generally have some unavoidable stray capacitive or inductive coupling between them, but the intent of the isolation is to minimize this stray coupling when compared with an electrically coupled path.

IC 224 is shown with a single antenna port, comprising two IC contacts electrically coupled to two antenna segments 226 and 228 which are shown here forming a dipole. Many other embodiments are possible using any number of ports, contacts, antennas, and/or antenna segments. Antenna segments 226 and 228 are depicted as separate from IC 224, but in other embodiments the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the IC contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments, the positions of strap substrate 254 and inlay 222 may be reversed, with strap substrate 254 mounted beneath inlay 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna couples with RF signals in the environment and propagates the signals to IC 224, which may both harvest power and respond if appropriate, based on the incoming signals and the IC's internal state. If IC 224 uses backscatter modulation then it may generate a response signal (e.g., signal 126) from an RF signal in the environment (e.g., signal 112) by modulating the antenna's reflectance. Electrically coupling and uncoupling the IC contacts of IC 224 can modulate the antenna's reflectance, as can varying the admittance or impedance of a shunt-connected or series-connected circuit element which is coupled to the IC contacts. If IC 224 is capable of transmitting signals (e.g., has its own power source, is coupled to an external power source, and/or is can harvest sufficient power to transmit signals), then IC 224 may respond by transmitting response signal 126. In the embodiments of FIG. 2, antenna segments 226 and 228 are separate from IC 224. In other embodiments, the antenna segments may alternatively be formed on IC 224.

An RFID tag such as tag 220 is often attached to or associated with an individual item or the item packaging. An RFID tag may be fabricated and then attached to the item or packaging, may be partly fabricated before attachment to the item or packaging and then completely fabricated upon attachment to the item or packaging, or the manufacturing process of the item or packaging may include the fabrication of the RFID tag. In some embodiments, the RFID tag may be integrated into the item or packaging, and portions of the item or packaging may serve as tag components. For example, conductive item or packaging portions may serve as tag antenna segments or contacts. Nonconductive item or packaging portions may serve as tag substrates or inlays. If the item or packaging includes integrated circuits or other circuitry, some portion of the circuitry may be configured to operate as part or all of an RFID tag IC. Thus, an "RFID IC" need not be distinct from an item, but more generally refers to the item containing an RFID IC and antenna capable of interacting with RF waves and receiving and responding to RFID signals. Because the boundaries between IC, tag, and item are thus often blurred, the term "RFID IC" or "RFID tag" as used herein may refer to the IC, the tag, or even to the item as long as the referenced element is capable of RFID functionality.

The components of the RFID system of FIG. 1 may communicate with each other in any number of modes. One such mode is called full duplex, where both reader 110 and tag 120 can transmit at the same time. In some embodiments, RFID system 100 may be capable of full duplex communication. Another such mode, which may be more suitable for passive tags, is called half-duplex, and is described below.

Figure 3:
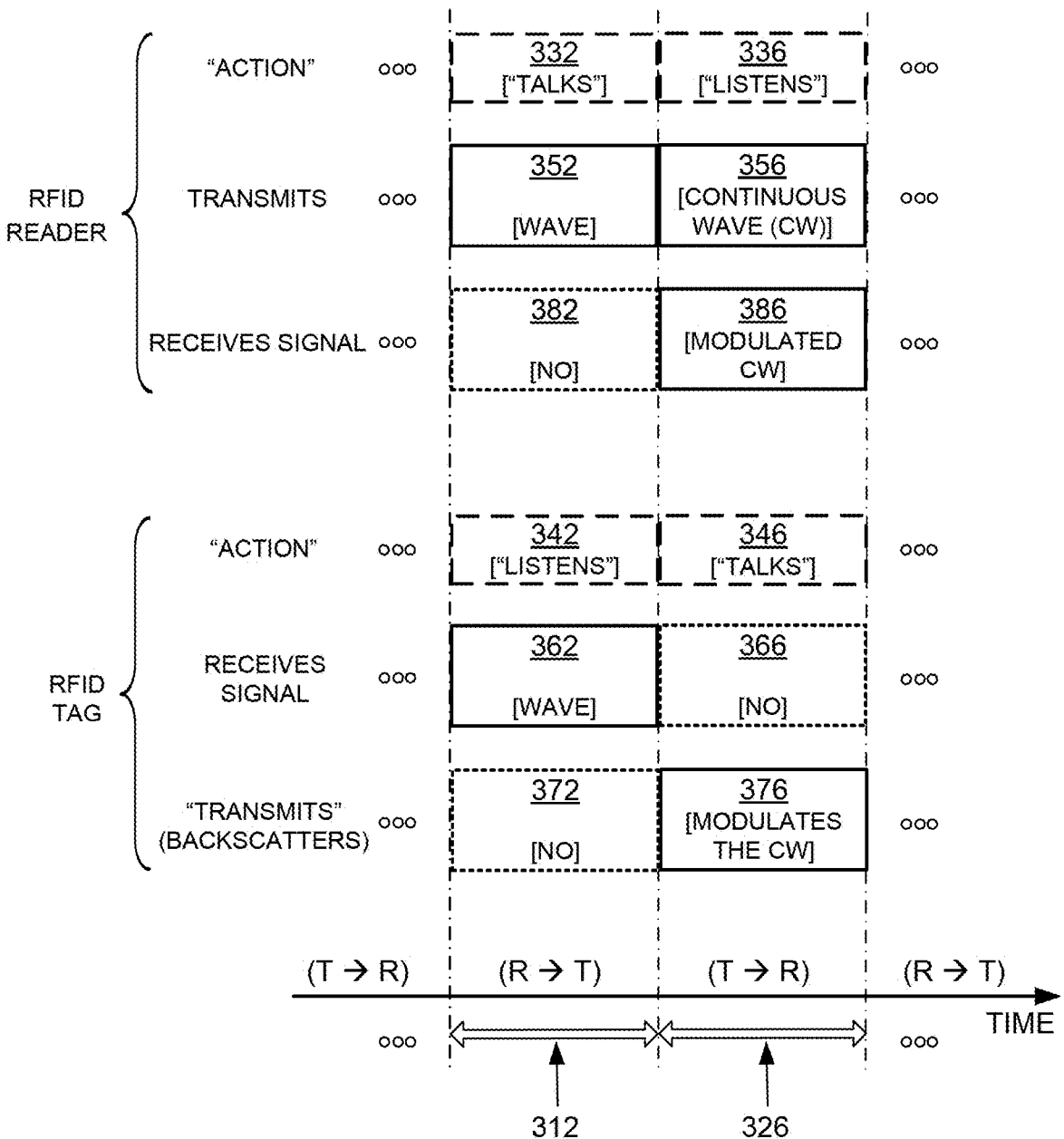
FIG. 3 is a conceptual diagram for explaining a half-duplex mode of communication between the components of the RFID system of FIG. 1.

FIG. 3 is a conceptual diagram 300 for explaining half-duplex communications between the components of the RFID system of FIG. 1, in this case with tag 120 implemented as a passive tag. The explanation is made with reference to a TIME axis, and also to a human metaphor of "talking" and "listening". The actual technical implementations for "talking" and "listening" are now described.

In a half-duplex communication mode, RFID reader 110 and RFID tag 120 talk and listen to each other by taking turns. As seen on axis TIME, reader 110 talks to tag 120 during intervals designated "R→T", and tag 120 talks to reader 110 during intervals designated "T→R". For example, a sample R→T interval occurs during time interval 312, during which reader 110 talks (block 332) and tag 120 listens (block 342). A following sample T→R interval occurs during time interval 326, during which reader 110 listens (block 336) and tag 120 listens (block 346). Interval 312 may be of a different duration than interval 326—here the durations are shown approximately equal only for purposes of illustration.

During interval 312, reader 110 transmits a signal such as signal 112 described in FIG. 1 (block 352), while tag 120 receives the reader signal (block 362), processes the reader signal to extract data, and harvests power from the reader signal. While receiving the reader signal, tag 120 does not backscatter (block 372), and therefore reader 110 does not receive a signal from tag 120 (block 382).

During interval 326, also known as a backscatter time interval or backscatter interval, reader 110 does not transmit a data-bearing signal. Instead, reader 110 transmits a continuous wave (CW) signal, which is a carrier that generally does not encode information. The CW signal provides energy for tag 120 to harvest as well as a waveform that tag 120 can modulate to form a backscatter response signal. Accordingly, during interval 326 tag 120 is not receiving a signal with encoded information (block 366) and instead modulates the CW signal (block 376) to generate a backscatter signal such as signal 126 described in FIG. 2. Tag 120 may modulate the CW signal to generate a backscatter signal by adjusting its antenna reflectance, as described above. Reader 110 then receives and processes the backscatter signal (block 386).

Figure 4:
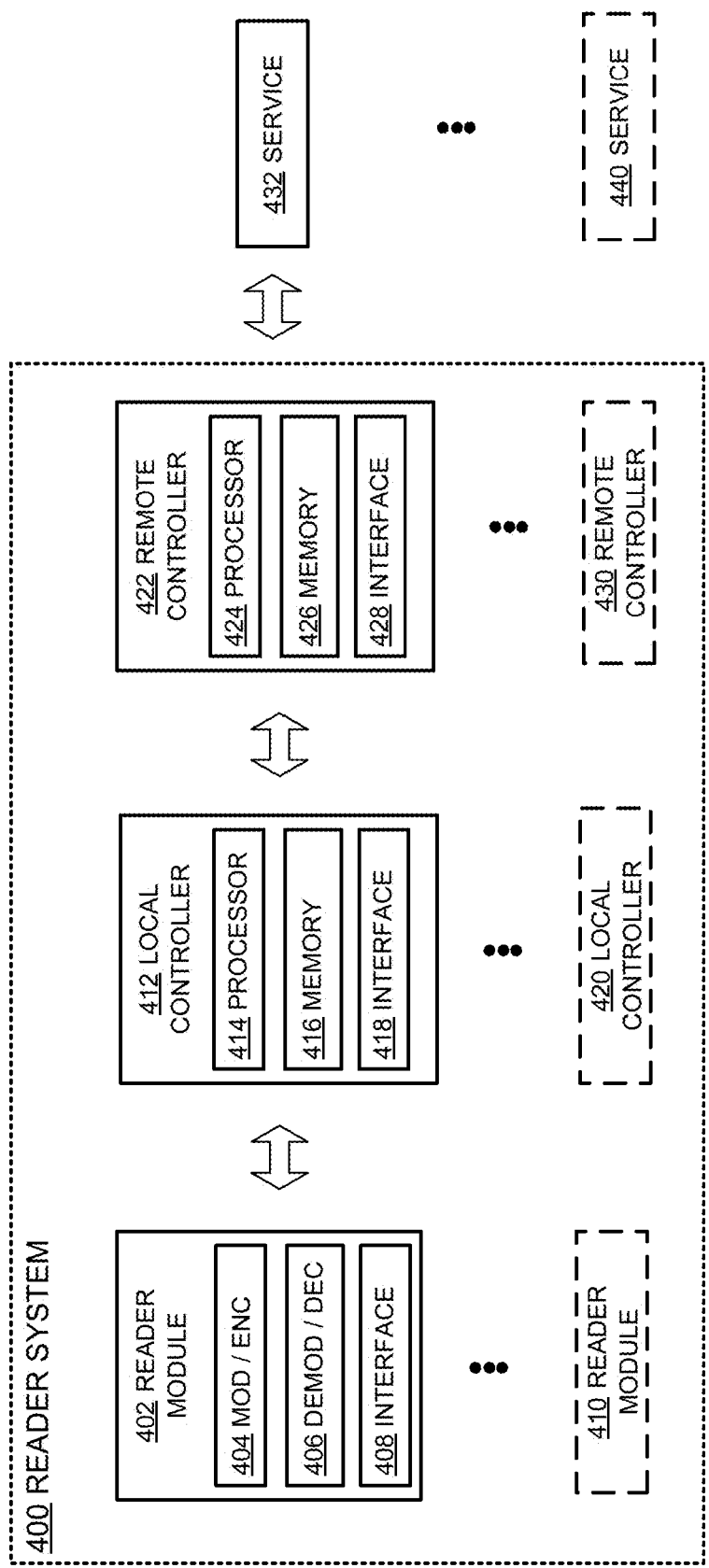
FIG. 4 is a block diagram showing a detail of an RFID reader system, such as the one shown in FIG. 1.

FIG. 4 depicts an RFID reader system 400 according to embodiments. Reader system 400 is configured to communicate with RFID tags and optionally to communicate with entities external to reader system 400, such as a service 432. Reader system 400 includes at least one reader module 402, configured to transmit signals to and receive signals from RFID tags. Reader system 400 further includes at least one local controller 412, and in some embodiments includes at least one remote controller 422. Controllers 412 and/or 422 are configured to control the operation of reader module 402, process data received from RFID tags communicating through reader module 402, communicate with external entities such as service 432, and otherwise control the operation of reader system 400.

In some embodiments, reader system 400 may include multiple reader modules, local controllers, and/or remote controllers. For example, reader system 400 may include at least one other reader module 410, at least one other local controller 420, and/or at least one other remote controller 430. A single reader module may communicate with multiple local and/or remote controllers, a single local controller may communicate with multiple reader modules and/or remote controllers, and a single remote controller may communicate with multiple reader modules and/or local controllers. Similarly, reader system 400 may be configured to communicate with multiple external entities, such as other reader systems (not depicted) and multiple services (for example, services 432 and 440).

Reader module 402 includes a modulator/encoder block 404, a demodulator/decoder block 406, and an interface block 408. Modulator/encoder block 404 may encode and modulate data for transmission to RFID tags. Demodulator/decoder block 406 may demodulate and decode signals received from RFID tags to recover data sent from the tags. The modulation, encoding, demodulation, and decoding may be performed according to a protocol or specification, such as the Gen2 Specification. Reader module 402 may use interface block 408 to communicate with local controller 412 and/or remote controller 422, for example to exchange tag data, receive instructions or commands, or to exchange other relevant information.

Reader module 402 and blocks 404/406 are coupled to one or more antennas and/or antenna drivers (not depicted), for transmitting and receiving RF signals. In some embodiments, reader module 402 is coupled to multiple antennas and/or antenna drivers. In these embodiments, reader module 402 may transmit and/or receive RF signals on the different antennas in any suitable scheme. For example, reader module 402 may switch between different antennas to transmit and receive RF signals, transmit on one antenna but receive on another antenna, or transmit and/or receive on multiple antennas simultaneously. In some embodiments, reader module 402 may be coupled to one or more phased-array or synthesized-beam antennas whose beams can be generated and/or steered, for example by reader module 402, local controller 412, and/or remote controller 422.

Modulator/encoder block 404 and/or demodulator/decoder block 406 may be configured to perform conversion between analog and digital signals. For example, modulator/encoder block 404 may convert a digital signal received via interface block 408 to an analog signal for subsequent transmission, and demodulator/decoder block 406 may convert a received analog signal to a digital signal for transmission via interface block 408.

Local controller 412 includes a processor block 412, a memory 416, and an interface 418. Remote controller 422 includes a processor block 422, a memory 426, and an interface 428. Local controller 412 differs from remote controller 422 in that local controller 412 is collocated or at least physically near reader module 402, whereas remote controller 422 is not physically near reader module 402. For example, local Processor blocks 412 and/or 422 may be configured to, alone or in combination, provide different functions. Such functions may include the control of other components, such as memory, interface blocks, reader modules, and similar; communication with other components such as reader module 420, other reader systems, services 432/440, and similar; data-processing or algorithmic processing such as encryption, decryption, authentication, and similar; or any other suitable function. In some embodiments, processor blocks 412/422 may be configured to convert analog signals to digital signals or vice-versa, as described above in relation to blocks 404/406; processor blocks 412/422 may also be configured to perform any suitable analog signal processing or digital signal processing, such as filtering, carrier cancellation, noise determination, and similar.

Processor blocks 412/422 may be configured to provide functions by execution of instructions or applications, which may be retrieved from memory (for example, memory 416 and/or 426) or received from some other entity. Processor blocks 412/422 may be implemented in any suitable way. For example, processor blocks 412/422 may be implemented using digital and/or analog processors such as microprocessors and digital-signal processors (DSPs); controllers such as microcontrollers; software running in a machine such as a general purpose computer; programmable circuits such as field programmable gate arrays (FPGAs), field-programmable analog arrays (FPAAs), programmable logic devices (PLDs), application specific integrated circuits (ASIC), any combination of one or more of these; and equivalents.

Memories 416/426 are configured to store information, and may be implemented in any suitable way, such as the memory types described above, any combination thereof, or any other known memory or information storage technology. Memories 416/426 may be implemented as part of their associated processor blocks (e.g., processor blocks 414/424) or separately. Memories 416/426 may store instructions, programs, or applications for processor blocks 414/424 to execute. Memories 416/426 may also store other data, such as files, media, component configurations or settings, etc.

In some embodiments, memories 416/426 store tag data. Tag data may be data read from tags, data to be written to tags, and/or data associated with tags or tagged items. Tag data may include identifiers for tags such as electronic product codes (EPCs), tag identifiers (TIDs), or any other information suitable for identifying individual tags. Tag data may also include tag passwords, tag profiles, tag cryptographic keys (secret or public), tag key generation algorithms, and any other suitable information about tags or items associated with tags.

Memories 416/426 may also store information about how reader system 400 is to operate. For example, memories 416/426 may store information about algorithms for encoding commands for tags, algorithms for decoding signals from tags, communication and antenna operating modes, encryption/authentication algorithms, tag location and tracking algorithms, cryptographic keys and key pairs (such as public/private key pairs) associated with reader system 400 and/or other entities, electronic signatures, and similar.

Interface blocks 408, 418, and 428 are configured to communicate with each other and with other suitably configured interfaces. The communications between interface blocks occur via the exchange of signals containing data, instructions, commands, or any other suitable information. For example, interface block 408 may receive data to be written to tags, information about the operation of reader module 402 and its constituent components, and similar; and may send data read from tags. Interface blocks 418 and 428 may send and receive tag data, information about the operation of other components, other information for enabling local controller 412 and remote controller 422 to operate in conjunction, and similar. Interface blocks 408/418/428 may also communicate with external entities, such as services 432, 440, other services, and/or other reader systems.

Interface blocks 408/418/428 may communicate using any suitable wired or wireless means. For example, interface blocks 408/418/428 may communicate over circuit traces or interconnects, or other physical wires or cables, and/or using any suitable wireless signal propagation technique. In some embodiments, interface blocks 408/418/428 may communicate via an electronic communications network, such as a local area network (LAN), a metropolitan area network (MAN), a wide area network (WAN), a network of networks such as the internet. Communications from interface blocks 408/418/428 may be secured, for example via encryption and other electronic means, or may be unsecured.

Reader system 400 may be implemented in any suitable way. One or more of the components in reader system 400 may be implemented as integrated circuits using CMOS technology, BJT technology, MESFET technology, and/or any other suitable physical implementation technology. Components may also be implemented as software executing on general-purpose or application-specific hardware.

In one embodiment, a "reader" as used in this disclosure may include at least one reader module like reader module 402 and at least one local controller such as local controller 412. Such a reader may or may not include any remote controllers such as remote controller 422. A reader including a reader module and a local controller may be implemented as a standalone device or as a component in another device. In some embodiments, a reader may be implemented as a mobile device, such as a handheld reader, or as a component in a mobile device such as a laptop, tablet, smartphone, wearable device, or any other suitable mobile device.

Remote controller 422, if not included in a reader, may be implemented separately. For example, remote controller 422 may be implemented as a local host, a remote server, or a database, coupled to one or more readers via one or more communications networks. In some embodiments, remote controller 422 may be implemented as an application executing on a cloud or at a datacenter.

Functionality within reader system 400 may be distributed in any suitable way. For example, the encoding and/or decoding functionalities of blocks 404 and 406 may be performed by processor blocks 414 and/or 424. In some embodiments, processor blocks 414 and 424 may cooperate to execute an application or perform some functionality. One of local controller 412 and remote controller 422 may not implement memory, with the other controller providing memory.

Reader system 400 may communicate with at least one service 432. Service 432 provides one or more features, functions, and/or capabilities associated with one or more entities, such as reader systems, tags, tagged items, and similar. Such features, functions, and/or capabilities may include the provision of information associated with the entity, such as warranty information, repair/replacement information, upgrade/update information, and similar; and the provision of services associated with the entity, such as storage and/or access of entity-related data, location tracking for the entity, entity security services (e.g., authentication of the entity), entity privacy services (e.g., who is allowed access to what information about the entity), and similar. Service 432 may be separate from reader system 400, and the two may communicate via one or more networks.

In some embodiments, an RFID reader or reader system implements the functions and features described above at least partly in the form of firmware, software, or a combination, such as hardware or device drivers, an operating system, applications, and the like. In some embodiments, interfaces to the various firmware and/or software components may be provided. Such interfaces may include application programming interfaces (APIs), libraries, user interfaces (graphical and otherwise), or any other suitable interface. The firmware, software, and/or interfaces may be implemented via one or more processor blocks, such as processor blocks 414/424. In some embodiments, at least some of the reader or reader system functions and features can be provided as a service, for example, via service 432 or service 440.

As mentioned previously, embodiments are directed to discriminating between different RFID-tagged items based on user input. Embodiments additionally include programs, and methods of operation of the programs. A program is generally defined as a group of steps or operations leading to a desired result, due to the nature of the elements in the steps and their sequence. A program is usually advantageously implemented as a sequence of steps or operations for a processor, but may be implemented in other processing elements such as FPGAs, DSPs, or other devices as described above.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. Information represented by the states of these quantities may be referred-to as bits, data bits, samples, values, symbols, characters, terms, numbers, or the like. However, these and similar terms are associated with and merely convenient labels applied to the appropriate physical quantities, individually or in groups.

Embodiments furthermore include storage media. Such media, individually or in combination with others, have stored thereon instructions, data, keys, signatures, and other data of a program made according to the embodiments. A storage medium according to embodiments is a computer-readable medium, such as a memory, and can be read by a processor of the type mentioned above. If a memory, it can be implemented in any of the ways and using any of the technologies described above.

Even though it is said that a program may be stored in a computer-readable medium, it does not need to be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought of in terms of various interconnected distinct software modules.

Figure 5:
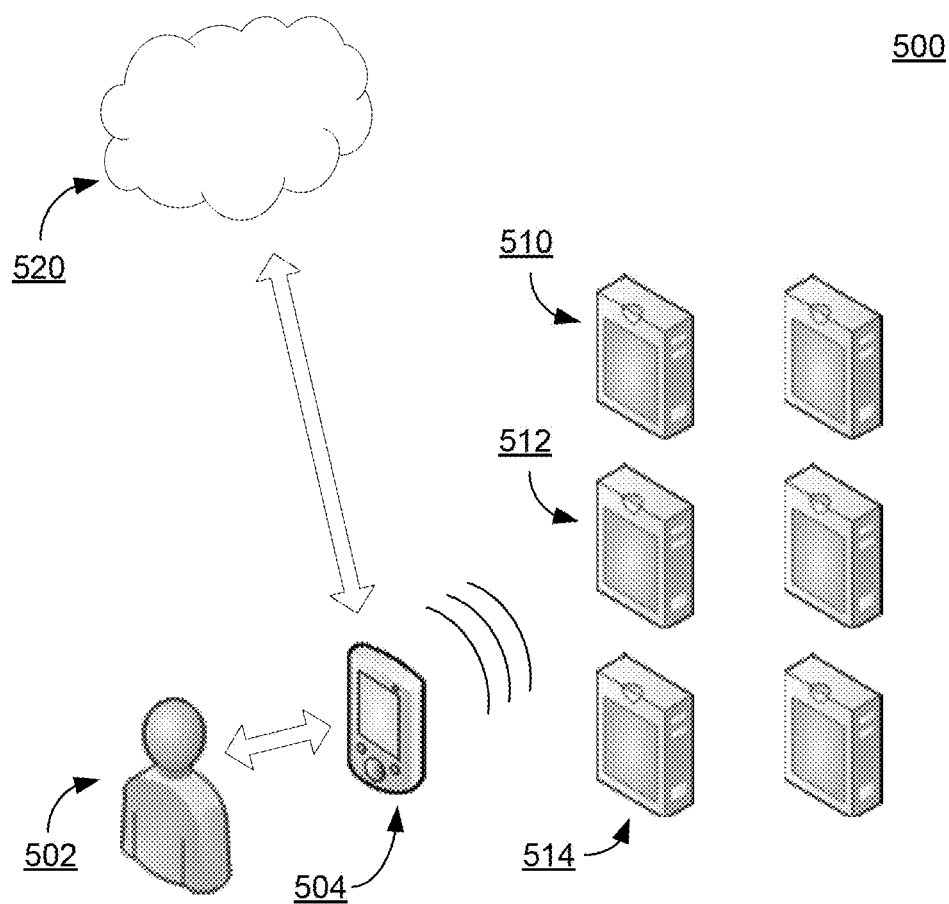
FIG. 5 depicts how an individual may use a device to retrieve information about RFID-tagged items according to embodiments.

FIG. 5 depicts how an individual may use an electronic device to retrieve information about RFID-tagged items according to embodiments.

Diagram 500 depicts RFID-tagged items 510, 512, and 514. Each of the RFID-tagged items has an associated RFID tag that stores a digital identifier for the corresponding item. An item's digital identifier serves to identify the item, and may include or be derived from an item identifier (e.g., an electronic product code), a tag identifier (for example, a TID or tag identification number), an identifier for a blockchain associated with the item, a pointer to an online record or ledger for the item, and/or any other information suitable for identifying the item.

In diagram 500, an individual 502 is interested in item 512, and uses an electronic device 504 to read item 512's digital identifier from its associated RFID tag, for example via an inventorying operation as described in the Gen2 Protocol. Electronic device 504 may be a portable device or combination of portable devices such as a smartphone, a tablet, a wearable, or any such suitable device or combination of the foregoing, and is either communicatively coupled to or configured to operate as an RFID reader. In the former case, in some embodiments electronic device 504 may communicate with a separate RFID reader that reads digital identifiers from RFID tags associated with items. For example, an RFID reader installed in a facility or associated with some other entity in the facility may read digital identifiers and send the digital identifiers to the electronic device 504. Such RFID readers may be stationary or mobile, and may be associated with the facility, with facility employees or personnel, or with other customers in the facility.

Device 504 then uses the digital identifier to retrieve detailed information about item 512. For example, device 504 may include a local database storing information about RFID-tagged items, or may communicate with a network 520 containing information about RFID-tagged items. In the latter case, device 504 may transmit item 512's digital identifier to network 520, which then uses the digital identifier to retrieve information about item 512 and transmits the retrieved information to device 504. Device 504 then presents the retrieved information to individual 502, for example by displaying the information on a screen.

Detailed information about item 512 is specific to item 512, and may include item physical characteristics (e.g., size, weight, color, ingredients or components, composition, etc.), identifying information (e.g., name, type, a portion of or the entirety of an item identifier, tag identifier, and/or digital identifier, etc.), purchase information (e.g., price, seller information, reviews, available coupons, offers, or other inducements to purchase, etc.), manufacture or production information (e.g., manufacturer, manufacture date, country or region of origin, information about how item 512 was manufactured or produced, expiration date, etc.), information about the history of item 512 (e.g., current owner, past owners, past locations, past item-related events, etc.), certification information (e.g., declaring whether item 512 has certain properties), safety or hazard information, service information (e.g., warranty information, insurance information, the services available for the desired item, etc.), potential actions associated with the item or its associated tag (e.g., purchase, decommission, activate, refrain from providing at least a portion of its digital identifier, activate or disable a privacy mode, etc.), or any other suitable information.

Information availability can be restricted based on the identity and/or authenticity of the requester. For example, network 520 may only provide some information in response to a request from device 504 (and by extension individual 502) upon authentication of device 504, individual 502, and/or the request. Similarly, device 504 may only provide potentially sensitive information to network 520 upon authentication of network 520. Some information associated with an item may only be provided if the item's provided digital identifier is authenticated, or if the digital identifier cannot be authenticated may be provided with a caveat, notice, or warning that the digital identifier cannot be authenticated.

Entities and requests can be authenticated in several ways. Individual 502 can be authenticated (e.g., by device 504 and/or network 520) using security information available only to individual 502 (e.g., a username or user identity, password or passphrase, a physical or cryptographic key, a series of gestures, etc.) or unique to individual 502 (e.g., biometrics such as voice, fingerprint, etc.), and known by the authenticating entity. Device 504 can be authenticated (e.g., by network 520) using security information such as a device identity, a device cryptographic key, a device signature, a device location, or similar. A request for information from device 504 can be authenticated (e.g., by network 520) using security information such as a request timestamp, an item selection timestamp, a location from which the request was sent, a location of the item at the time of the request or selection, or similar. Network 520 can be authenticated (e.g., by device 504 and optionally item 512) using security information such as a network identifier, a network cryptographic key, a network signature, or similar. Item 512's digital identifier can be authenticated (e.g., by device 504 and/or network 520) via a challenge-response mechanism, in which a challenge is sent to item 512's associated RFID tag, the tag generates and responds with a cryptographic response computed based on the challenge and a tag key, and authenticating information including at least the cryptographic response and the tag digital identifier is sent to an entity (e.g., device 504 and/or network 520) with knowledge of the tag key associated with the tag digital identifier.

If the entity confirms that the cryptographic response is correctly based on the challenge and the tag key, then the entity indicates that the tag digital identifier is authentic. On the other hand, if the cryptographic response is inappropriate for the challenge and/or tag key, or if the entity cannot confirm that the cryptographic response is correct, then the entity may indicate that the cryptographic response is inappropriate for the item, and that the tag digital identifier is not authentic or cannot be authenticated. The entity may indicate that the cryptographic response is inappropriate for the item, and that the tag digital identifier is not authentic or cannot be authenticated, by sending a message to a device such as device 504 and/or a network such as network 520, displaying an error message to an individual, or refraining from responding to the provider of the authenticating information. Of course, any other suitable means for authentication as known to those skilled in the art may be used to authenticate entities and requests. For example, another tag (e.g., a proxy tag) may authenticate item 512 on behalf of the item 512 and/or its associated tag.

Information availability may vary based on requester identity, request origination location, and/or item location. For example, the information available to a requester who owns item 512 may differ from the information available to a requester who wishes to purchase item 512. A requester, upon providing security information, can be assigned an authorization level, which in turn can be used to determine information availability. As another example, different information may be available to a request originating from one location (e.g., a retail facility) than a request originating from another location (e.g., a private home). As yet another example, different information may be available to a request if an item is at one location than at another location. Item location in this case may be based on request origination location, a verifiable location signal (e.g., from a beacon or similar), and/or item location history (e.g., the item was last confirmed at a certain location).

If the entities and request are deemed authentic and information is available, then the available information is provided for presentation to individual 502 by device 504 and/or network 520. However, if one or more entities or the request cannot be authenticated, or no information is available, then information may not be provided for presentation to individual 502. In this situation, an error message or some other failure indication can be provided, or no indication may be provided. In some cases, such as when an item's digital identifier cannot be authenticated, information about the item or digital identifier may be provided with a warning or notice that authentication failed.

If RFID-tagged items other than item 512 are present and within the read range of device 504, device 504 may also read the digital identifiers of those items. However, device 504 may not know the specific item (e.g., item 512) that individual 502 is interested in, and therefore may have difficulty determining what information to present to individual 502. Device 504 may resolve this ambiguity by estimating the item that individual 502 is most likely interested in (itself or with the assistance of network 520), or by asking individual 502 to indicate the item of interest.

In the latter case, device 504 may retrieve item-specific, distinguishing information (e.g., from local or remote storage) that allows individual 502 to distinguish between different items and present the distinguishing information to individual 502. Distinguishing information for an item may include an item image (an actual image and/or a stylized image, such as a diagram, icon, cartoon, or other visual representation), an item name, an item size, item physical appearance (e.g., color or shape), item physical characteristics (e.g., material or composition), and/or any other information allowing individual 502 to distinguish between different items. Individual 502 can then interact with device 504 to select the desired item based on the distinguishing information.

Figure 6:
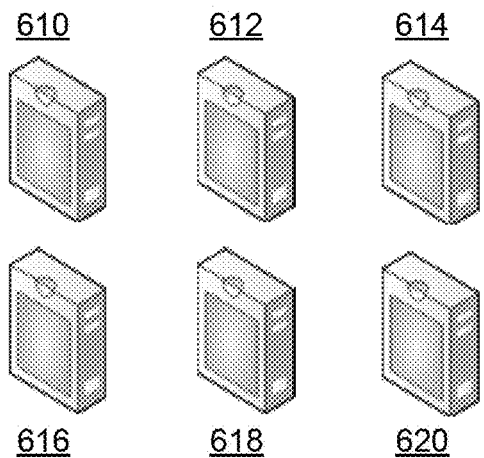
FIG. 6 depicts how a device may use a captured image to determine how information about multiple RFID-tagged items is to be presented according to embodiments.
Figure 6:
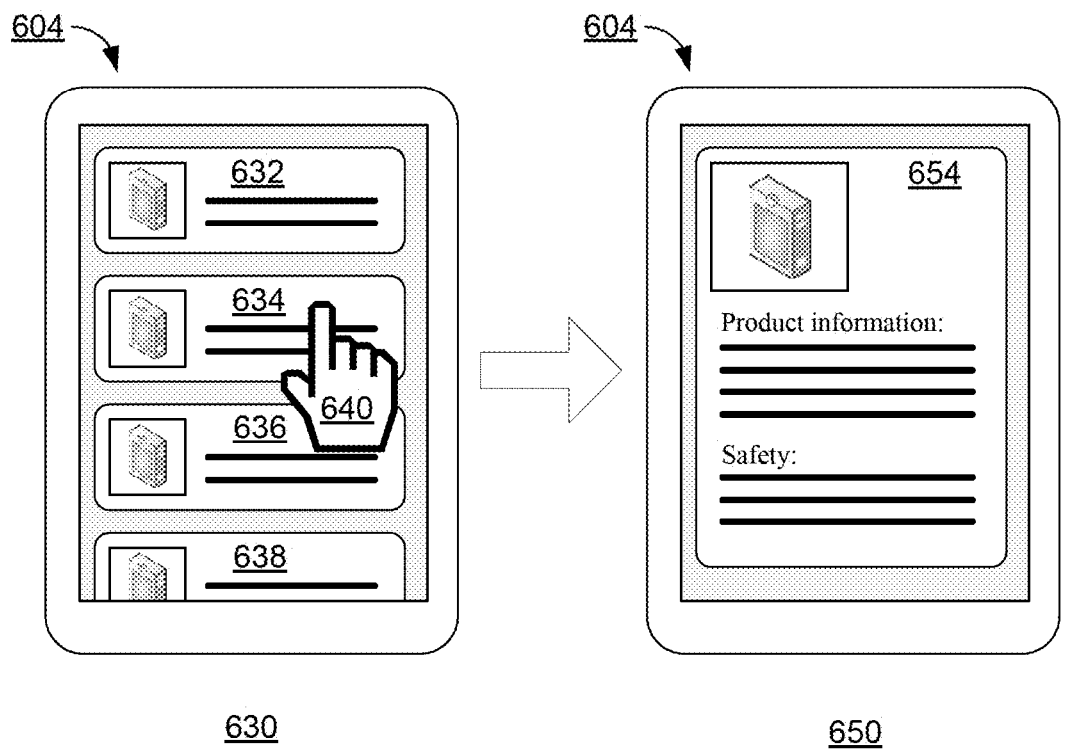

In one embodiment, device 504 displays distinguishing information for different items in a list or array, and individual 502 selects the desired item from the list or array. FIG. 6 depicts how a device may present information about multiple RFID-tagged items for discrimination between different RFID-tagged items according to embodiments. In diagram 600, multiple RFID-tagged items 610-620 are clustered together such that an RFID reader cannot read the digital identifier of a certain item without reading the digital identifiers of at least one other item. Accordingly, when an individual uses electronic device 604 to read the digital identifier of a desired RFID-tagged item, such as item 614, device 604 may also read digital identifiers for undesired items 610, 612, 616, 618, and/or 620. Device 604 may determine distinguishing information about each item using the digital identifiers (for example, by sending the digital identifiers to a network and receiving the distinguishing information in response) and present the information on, for example, an electronic display or screen. Diagram 630 depicts how device 604 may display information about multiple items. For example, if device 604 read digital identifiers for items 612, 614, 616, and 618, device 604 may display abbreviated listings 632, 634, 636, and 638, each including some distinguishing information about items 612, 614, 616, and 618, respectively. The distinguishing information, described above, may include representative image (s) and/or text that allows an individual to distinguish between the different items 612-618.

An individual can then perform a selection 640 of the abbreviated listing (e.g., abbreviated listing 634) corresponding to the desired item (e.g., item 614). Selection 640 may be performed by a cursor, a stylus, a gesture or touch from the individual, a voice command, or any other suitable method for selection for device 604. In response to selection 640, device 604, if authorized, displays available detailed information about the desired item in an expanded listing 654, depicted in diagram 650. Device 604 may store the detailed information, or may retrieve the detailed information from an external location (for example, a network) prior to selection 640 (for example, upon initially reading the digital identifier of the desired item) or in response to selection 640. In some embodiments, authentication of the individual, device 604, any relevant external networks, and/or items 610-620 may occur when device 604 displays and/or requests distinguishing and/or detailed information about the desired item, to determine authorized and available information.

Expanded listing 654 includes more information about item 614 as compared to abbreviated listing 634, such as additional images of item 614, additional product information, safety information, and other detailed information about item 614 as described above. Expanded listing 654 may also allow an individual to perform some action associated with item 614, such as saving item 614 as a favorite item, adding a note associated with item 614, purchasing item 614, or other actions as described above. In this instance, expanded listing 654 may include one or more selectable options or icons that enables the selection of some action associated with item 614. In some embodiments, an abbreviated listing such as the listings 632-638 may also allow an individual to perform some item-related action.

In the example described in FIG. 6, access to item information may be restricted to authenticated entities, as described in FIG. 5. For example, the individual, device 604, any relevant external networks, and/or items 610-620 may be authenticated before distinguishing information, detailed information, and/or potential item-related actions are provided to device 604. If one or more entities cannot be authenticated, then the unauthenticated entities may receive no information, limited information, error message(s), and/or any other suitable information.

In some situations, device 604 may display an abbreviated or expanded listing for a selected item even if the digital identifier for the selected item cannot be authenticated. Digital identifier authentication may fail because the item is a counterfeit or because an authentication service cannot be reached. If device 604 displays an abbreviated or expanded listing for an item whose digital identifier cannot be authenticated, the listing may include an indication to that effect. For example, a warning that the item may be counterfeit or cannot be authenticated may be displayed on the listing.

Figure 7:
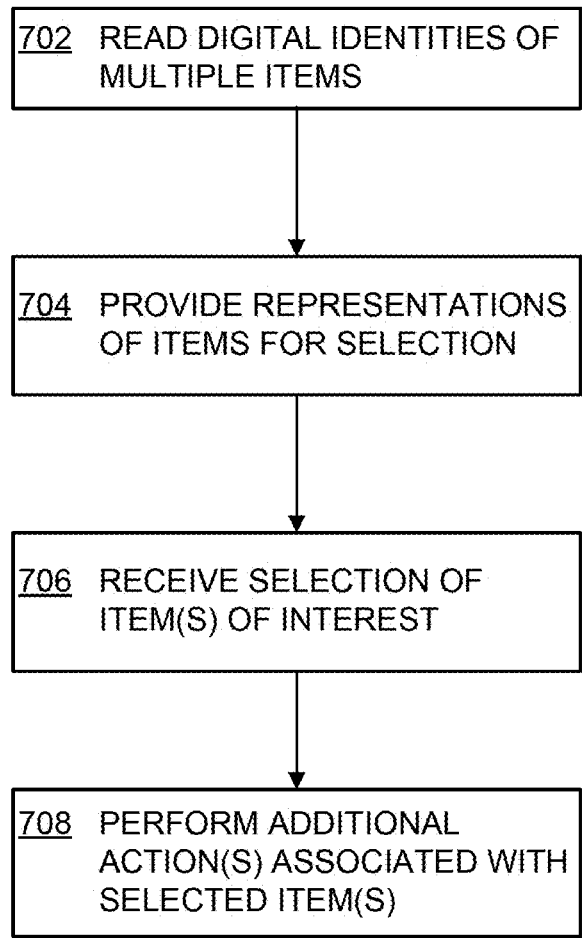
FIG. 7 is a flow diagram depicting a process for discriminating between desired and undesired RFID-tagged items based on user input according to embodiments.

FIG. 7 is a flow diagram depicting a process 700 for discriminating between desired and undesired RFID-tagged items based on user input according to embodiments. Process 700 begins at step 702, where a device (for example, device 504) reads digital identifiers from multiple RFID ICs, each associated with one of multiple, different items. At step 704, the device provides representations of the items for selection. For example, the device may determine some distinguishing information for the items, such as images, names, and the like, and may present the distinguishing information. The distinguishing information may be presented visually (e.g., on a display as described in FIG. 6), aurally, or in any suitable way. The device may determine the distinguishing information from information previously stored at the device and/or from information received from a network location or entity.

At step 706, the device receives a selection of one or more items of interest. The selection may be performed using a cursor, a stylus, a gesture, touch, or motion, a voice instruction, or any other suitable selection method. At step 708, the device performs one or more additional actions associated with the selected item(s). For example, the device may display detailed information about the selected item(s), or may initiate another process associated with the selected item(s), such as a purchase.

While process 700 does not depict any authentication steps, one or more of the involved entities can be authenticated. For example, the device, an individual using the device, the digital identifiers read in step 702, and/or a network or network location potentially storing additional information about the multiple items may be authenticated as described above, before retrieving and/or providing item information. In some embodiments, process 700 may terminate if all involved entities cannot be authenticated. In other embodiments, process 700 continues if at least one entity is authenticated, but with error indicators, error indicators, and/or limited information being provided in steps 704 and/or 708 as appropriate.

In some embodiments, the item that an individual is most likely interested in may be estimated by a device and/or network without additional, explicit input from the individual to the device. For example, the device and/or a connected network may determine an associated relevancy for each detected item and may estimate that the item with the highest relevancy is the desired item. An item's relevancy may be based on metrics such as item proximity, item movement, information about items previously selected by the individual, any other suitable information, and/or a combination of any of the previous.

Item proximity may be determined in any suitable way. For example, item proximity may be determined using a received signal strength indication (RSSI) value or a read count (defined as the number of times an RFID-tagged item is read by a device over some time duration or number of opportunities), where an item with higher RSSI values or read counts tends to be closer to the reading device than an item with lower RSSI values or read counts. In some embodiments, a device determines item proximity based on image and size information, as described below in FIG. 8. Alternatively, the device and/or the item may include one or more interfaces or antennas configured to operate at short range. When the device detects an item using its short-range interface or antenna, the device may determine that the detected item is in close proximity. In other embodiments, a separate device or entity may determine proximity between the device and a detected item and send the determined proximity to the device. Items with closer proximity to a device may have higher relevance than items with farther proximity to the device.

Item movement may be determined in any suitable way. For example, item movement may be determined based on detected changes in RSSI values and/or read counts over time, where an item with successively lower RSSI values and/or read counts may be moving away from a device whereas an item with successively higher RSSI values and/or read counts may be moving toward the device. An item may also itself indicate to the device that it is moving, as described in commonly-assigned U.S. patent application Ser. No. 16/382,233 filed on Apr. 12, 2019 and hereby incorporated by reference in its entirety. An item's relevancy may be based on whether the item is moving, the item's movement speed, and/or the item's movement speed with respect to other, nearby items. For example, an item that is moving differently with respect to other items (e.g., in a different direction or with a different speed) may have relatively high relevance. Such a situation may occur when an individual picks up a particular item, for example to bring it closer for examination. In this situation, a combination of item proximity and item movement may be used to determine item relevancy. For example, an item determined to have the closest proximity to a reader (in other words, is determined to be closest to the reader) and to be moving with respect to other items and/or the reader may have the highest relevancy.

Item relevancy can also be determined based on individual selection history. For example, information about items previously selected or searched for by the individual may be available to a device and/or a connected network, and items that are more similar to previously-selected items may be deemed more relevant than items that are less similar to previously-selected items. In other embodiments, other information about the individual may be used to determine item relevancy, such as purchase history, user preferences, owned items, and the like.

Determined item relevancy may be used to rank or order items for presentation. For example, a device may be configured to present information about items with relatively higher relevancy before, on top of, and/or with more emphasis than information about items with relatively lower relevancy. In one embodiment, the device may display a list of items, with items having higher relevancy disposed above items with lower relevancy, for selection by an individual. In embodiments where a device is configured to estimate an individual's desired item, the device may select the item with the highest determined relevancy as the desired item. If additional items are to be selected, the device may iterate through the remaining unselected items by relevancy, for example by selecting and presenting information about the item with the next highest determined relevancy. In some embodiments, item relevancy may be redetermined at any time. For example, upon presenting an item estimated to have the highest relevancy but receiving feedback that the item is not the desired item, relevancy for the item and other items may be redetermined based on the feedback.

In some embodiments, the item may also or instead be configured with a user-adjustable component, such as a switch or button, capable of indicating that an individual has adjusted the item. For example, the item may implement a switch that completes or breaks an electrical circuit, such as a connection to an antenna, when actuated. The device may be configured to detect the behavior of the electrical circuit, and can determine that an individual has actuated the switch and therefore the associated item has high relevance and is likely to be the desired item.

In other embodiments, a device may capture an image or video to assist in identifying desired items and prioritizing other items. For example, an individual may cause the device to capture an image as a way to select a desired item, or the device may automatically (or based on some other criterion) capture an image. In some embodiments, the device may capture an image or video of the individual manipulating (e.g., holding, touch, or pointing at) the item of interest. The device may then use the captured image or video to identify a desired item and/or prioritize items by relevancy.

Figure 8:
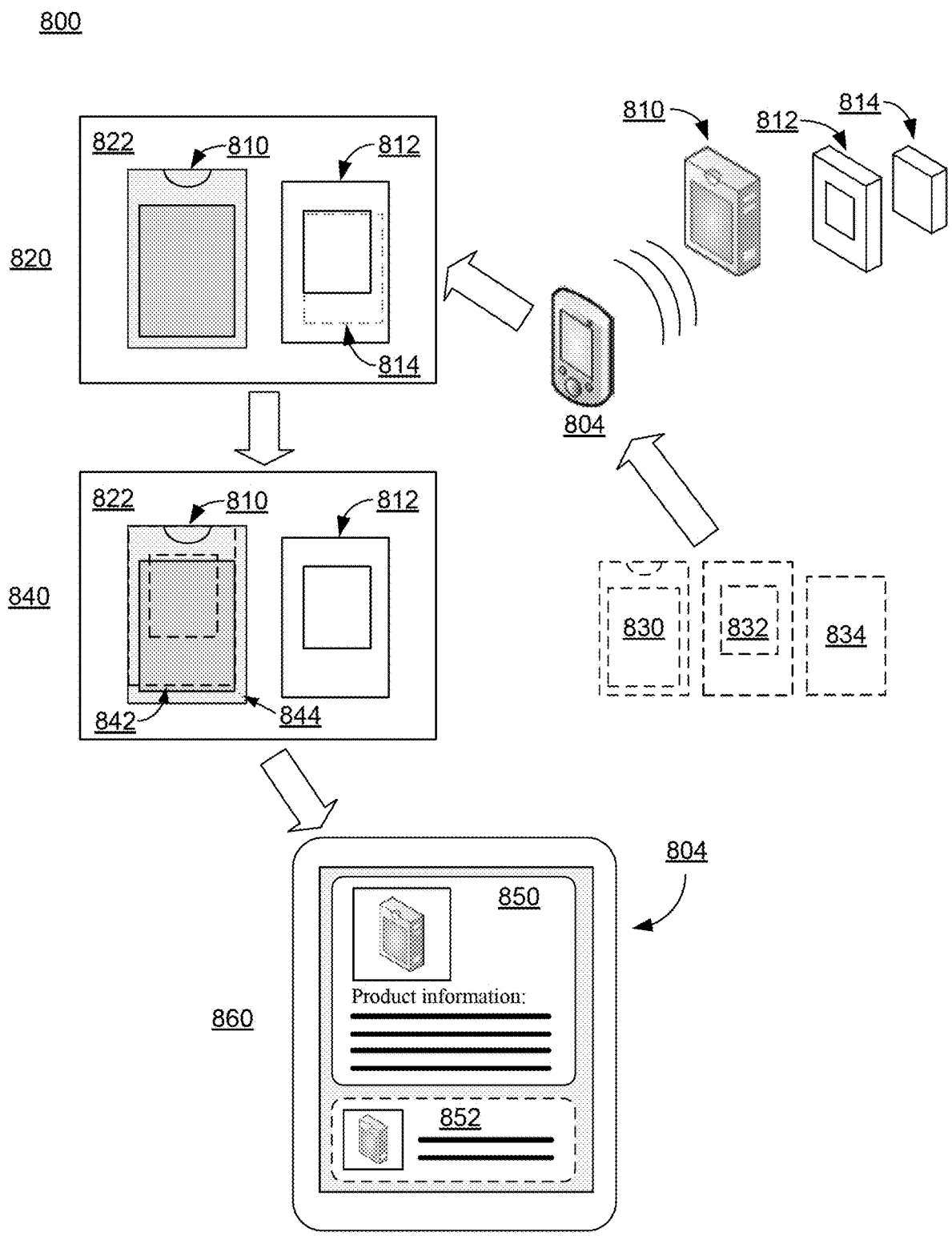
FIG. 8 depicts how a device may use a captured image to determine the relevancy of RFID-tagged items.

FIG. 8 depicts how a device may use a captured image to determine the relevancy of RFID-tagged items. Diagram 800 depicts a situation where an electronic device 804 reads the digital identifiers of items 810, 812, and 814, where item 810 is closer to device 804 than item 812, and item 814 is physically obscured by item 812. Device 804 is also configured with a still or video camera, and may record an image 822 as depicted in diagram 820, for example when the digital identifiers of items 810, 812, and/or 814 are read, or when an individual initiates an item-selection process on device 804. Image 822 depicts items 810 and 812, but not item 814 (shown in dashed outline), because item 812 obscures item 814.

Once device 804 has read the digital identifiers, device 804 uses the digital identifiers to determine or request (e.g., from a network source) image and size information 830, 832, and 834 about items 810, 812, and 814, respectively. Image/size information 830-834 includes data about the appearance of items 810-814, for example in the form of item images from different perspectives, visual features, visual characteristics, or any other information related to image processing and recognition. Image/size information 830-834 also includes data about the sizes of items 810-814. Device 804 then attempts to locate items 810-814 in image 822 using, for example, the image processing and recognition data in information 830-834. Device 804 successfully locates item 810 and item 812 in image 822, but does not locate item 814 because it is behind and obscured by item 812.

After locating items in image 822, device 804 attempts to determine the proximity of the located items using the size data in information 830-834. In some embodiments, device 804 determines absolute item proximity. An item's absolute proximity to device 804 is the distance between the item and device 804. When determining absolute item proximity, device 804 may compare the size data for an item with an apparent item size in the image and use known parameters of the device camera to determine the distance of the item from the camera lens (and therefore device 804).

Device 804 may also determine relative item proximity. An item's relative proximity to device 804 is in relation to at least one other item, and can be whether the item is closer to device 804 than the other item. When determining relative item proximity, device 804 can compare the apparent sizes (in image 822) of two or more items with their size data to determine whether one of the items is closer to device 804 than the other. In one embodiment, device 804 may first determine absolute item proximities as described above for each item, then determine relative item proximities based on the absolute item proximities. In another embodiment, device 804 determines a size difference between items based on size data, then compares the size difference to any size differences in the apparent item sizes.

Diagram 840 depicts a situation in which device 804 attempts to determine the relative proximities of items 810 and 812 using item size differences. In diagram 840, device 804 first determines, based on information 830/832, that items 810 and 812 are the same size. Device 804 then compares the apparent sizes of items 810 and 812 in image 822. For example, device 804 may determine that the apparent size of item 810 is larger than the apparent size of item 812 by a difference 844, as shown via an illustrative overlay 842 of item 812 over item 810. Accordingly, device 804 may conclude that item 810 is closer than item 812. Of course, device 804 can equally determine that the apparent size of item 812 is smaller than the apparent size of item 810 by some difference, and can conclude that item 812 is farther than item 810 based on the determination. In some embodiments, device 804 may generate scaled sizes for items 810 and 812 based on information 830/832, and may compare the apparent sizes of items 810 and 812 in image 822 to the scaled sizes. In other embodiments, device 804 may also use RSSI values and/or read counts for items 810 and 812 to assist in determining proximity, as described above.

Device 804 may then determine that the item 810, being the closest, has the highest relevance and therefore is the desired item. Diagram 860 depicts how device 804 may present information about item 810 and optionally other items. In diagram 860, device 804 presents detailed information 850 about item 810. In some embodiments, device 804 may also present an optional listing 852 for item 812. Optional listing 852 is less prominent than detailed information 850, because device 804 did not deem item 812 to be an item of interest. Nevertheless, device 804 may be configured to provide information about items other than the estimated item of interest, to allow a user to correct the estimation if necessary. In some embodiments, device 804 may not provide information for item 814, because device 804 was unable to locate item 814 in image 822 despite reading item 814's digital identifier. Optionally, a device may show an item listing even if the item is not found in an associated image. In this case, the item listing may be deemed to have relatively low relevance, and therefore appear lower on the list. In any case, a device displaying information about one or more items can display information for additional, detected items upon request.

As mentioned above, a device such as device 804 may display information about detected items in order of relevance. For example, a device may display listings for more relevant items above or larger than listings for less relevant items.

Figure 9:
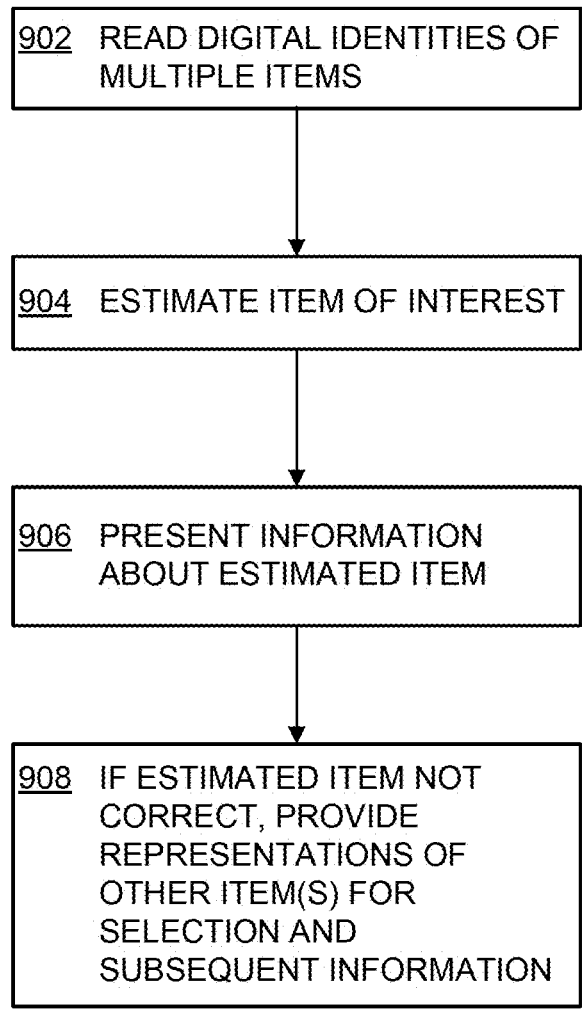
FIG. 9 is a flow diagram depicting a process for presenting information about an estimated item of interest.

FIG. 9 is a flow diagram depicting a process 900 for presenting information about an estimated item of interest. Process 900 begins at step 902, where a device (for example, device 504 or 804) reads digital identifiers from multiple RFID ICs, each associated with one or multiple, different items. At step 904, the device (and/or an associated network) estimates an item of interest from the multiple items. For example, a relevancy may be determined for each of the items, and the item with the highest relevancy may be estimated as the item of interest. As described above, relevancy may be based on one or more metrics such as item proximity, item movement, information about previously-selected items, captured images (e.g., as described in FIG. 8), any other suitable information, and/or a combination of the foregoing.

Upon estimating the item of interest, the device may determine information about the item of interest (either stored locally at the device or from a network) and at step 906 the device may present the information, which may be an abbreviated listing, expanded listing, and/or detailed information, as described above. The information may allow a user to perform some action or process related to the item, also as described above. For example, the user may provide feedback confirming that the presented information corresponds to the desired item and may subsequently provide input to perform action(s) related to the item. The presented information may also allow a user to indicate that the information does not correspond to the desired item and therefore the estimated item of interest is incorrect. If this is the case, then at step 908 the device may provide representations of one or more other items for selection and subsequent information, similar to steps 704, 706, and 708 in process 700. In some embodiments, the device may estimate the next most likely item of interest, based on the metrics described above, and retrieve and/or present information about the estimated item. If the newly selected item is not the item of interest, then the device may either continue to estimate and present information about the next most likely item of interest or present multiple items for user selection, as described above. If the former, then the device may stop estimating and presenting information about other items of interest if the device stops receiving feedback or the number of rejected items exceeds a threshold. If the number of rejected items exceeds the threshold, the device may then present information about multiple items for selection.

Like process 700, while process 900 does not depict any authentication steps, one or more of the involved entities can be authenticated. For example, the device, an individual using the device, the digital identifiers read in step 902, and/or a network or network location potentially storing additional information about the multiple items may be authenticated as described above, before retrieving and/or providing item information. In some embodiments, process 900 may terminate if all involved entities cannot be authenticated. In other embodiments, process 900 continues if at least one entity is authenticated, but with error indicators, error indicators, and/or limited information being provided in steps 906 and/or 908 as appropriate.

The operations described in processes 700 and 900 are for illustrative purposes only. These operations may be implemented using additional or fewer operations and in different orders using the principles described herein.

According to some examples, a method for an electronic device communicatively coupled to an RFID reader to identify a desired item from among multiple items within read range of the RFID reader is provided. The method includes reading, using the RFID reader, multiple digital identifiers, each identifier associated with an item in the multiple items. The method further includes selecting a first identifier from among the multiple identifiers based on a metric including a proximity and/or a movement and determining that the first identifier is not associated with the desired item by displaying item data associated with the first identifier on a screen of the electronic device and receiving feedback that the item data do not correspond to the desired item. The method may include sending the identifiers to a network and receiving item data associated with each of the identifiers from the network. The method further includes selecting at least a second identifier from among the multiple identifiers based on the metric, displaying additional item data associated with at least the second identifier on the screen, and receiving feedback that the additional item data corresponds to the desired item. The method may include selecting multiple other identifiers, displaying additional item data associated with the other identifiers on the screen, and receiving feedback that one of the other identifiers corresponds to the desired item.

According to some embodiments, selecting the first identifier may include determining a respective proximity for each item based on a received signal strength indicator (RSSI) and/or a read count, determining that a first item has a closest proximity to the reader, determining that the first item is associated with the first identifier, and selecting the first identifier. Selecting the first identifier may include determining that a first item is moving toward the reader and moving with respect to at least one other item, determining that the first item is associated with the first identifier, and selecting the first identifier. Selecting the first identifier may include determining a respective proximity for each item, determining that at least one item is moving, determining that a first item both has a closest proximity to the reader and is moving, determining that the first item is associated with the first identifier, and selecting the first identifier.

According to other embodiments, the metric may further include information about previously selected items and/or a user of the device. Selecting at least the second identifier and/or the multiple other identifiers may include selecting at least two additional identifiers, displaying the additional item data may include simultaneously displaying abbreviated item data for each of the additional identifiers, and receiving feedback that the additional item data corresponds to the desired item may include receiving a selection of one of the abbreviated item data. The method may further include determining that the device is authorized for the item data before displaying the item data based on a location of the item associated with the first identifier, a time of selection of the first identifier, a type of the item data, a location of the device, an identity of the device, and/or a user identity associated with the device.

The foregoing detailed description has set forth various embodiments of the devices and/or processes via the use of block diagrams and/or examples. Insofar as such block diagrams and/or examples contain one or more functions and/or aspects, each function and/or aspect within such block diagrams or examples may be implemented individually and/or collectively, by a wide range of hardware, software, firmware, or virtually any combination thereof. Some aspects of the embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). Any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. All language such as "up to," "at least," "greater than," "less than," and the like include the number recited and refer to ranges which can be subsequently broken down into subranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

I claim:

1. A method for an electronic device communicatively coupled to a Radio Frequency Identification (RFID) reader to identify a desired item from among a plurality of items within read range of the RFID reader, the method comprising:
    reading, using the RFID reader, a plurality of digital identifiers, each identifier associated with an item in the plurality of items;
    selecting, based on a metric including one or more of a proximity or a movement, a first identifier from among the plurality of identifiers;
    determining that the first identifier is not associated with the desired item by:
        displaying, on a screen of the electronic device, item data associated with the first identifier; and
        receiving feedback that the item data do not correspond to the desired item;
    selecting, based on the metric, at least a second identifier from among the plurality of identifiers;
    after determining that the first identifier is not associated with the desired item, displaying on the screen additional item data associated with at least the second identifier; and
    receiving feedback that the additional item data corresponds to the desired item.

2. The method of claim 1, wherein selecting the first identifier comprises:
    determining a respective proximity for each item in the plurality of items based on at least one of a received signal strength indicator (RSSI) and a read count;
    determining that a first item in the plurality of items has a closest proximity to the reader;
    determining that the first item is associated with the first identifier; and
    selecting the first identifier.

3. The method of claim 1, wherein selecting the first identifier comprises:
    determining that a first item in the plurality of items is moving toward the reader;
    determining that the first item is moving with respect to at least one other item in the plurality of items;
    determining that the first item is associated with the first identifier; and
    selecting the first identifier.

4. The method of claim 1, wherein selecting the first identifier comprises:
    determining a respective proximity for each item in the plurality of items;
    determining that at least one item in the plurality of items is moving;
    determining that a first item in the plurality of items both has a closest proximity to the reader and is moving;
    determining that the first item is associated with the first identifier; and
    selecting the first identifier.

5. The method of claim 1, wherein the metric further includes information about previously selected items and/or a user of the device.

6. The method of claim 1, wherein:
    selecting at least the second identifier comprises selecting at least two additional identifiers from among the plurality of identifiers;
    displaying the additional item data comprises simultaneously displaying abbreviated item data for each of the additional identifiers; and
    receiving feedback that the additional item data corresponds to the desired item comprises receiving a selection of one of the abbreviated item data.

7. The method of claim 1, further comprising:
    before displaying the item data, determining that the device is authorized for the item data based on at least one of:
    a location of the item associated with the first identifier,
    a time of selection of the first identifier,
    a type of the item data,
    a location of the device,
    an identity of the device, and
    a user identity associated with the device.

8. A method for an electronic device communicatively coupled to a Radio Frequency Identification (RFID) reader to identify a desired item from among a plurality of items within read range of the RFID reader, the method comprising:
    reading, using the RFID reader, a plurality of digital identifiers, each identifier associated with an item in the plurality of items;
    sending, to a network, the plurality of identifiers;
    receiving, from the network, item data associated with each of the plurality of identifiers;
    selecting, using a metric including one or more of proximity or movement, a first identifier from among the plurality of identifiers;
    determining that the first identifier is not associated with the desired item by:

displaying, on a screen of the electronic device, item
data associated with the first identifier; and
receiving feedback that the item data do not correspond
to the desired item;
selecting, based on the metric, at least a second identifier
from among the plurality of identifiers;
after determining that the first identifier is not associated
with the desired item, displaying on the screen additional item data associated with at least the second
identifier; and
receiving feedback that the additional item data corresponds to the desired item.

9. The method of claim 8, wherein selecting the first identifier comprises:
determining a respective proximity for each item in the plurality of items based on at least one of a received signal strength indicator (RSSI) and a read count;
determining that a first item in the plurality of items has a closest proximity to the reader;
determining that the first item is associated with the first identifier; and
selecting the first identifier.

10. The method of claim 8, wherein selecting the first identifier comprises:
determining a respective proximity for each item in the plurality of items;
determining that at least one item in the plurality of items is moving;
determining that a first item in the plurality of items both has a closest proximity to the reader and is moving;
determining that the first item is associated with the first identifier; and
selecting the first identifier.

11. The method of claim 8, wherein the metric further includes information about previously selected items and/or a user of the device.

12. The method of claim 8, wherein:
selecting at least the second identifier comprises selecting at least two additional identifiers from among the plurality of identifiers;
displaying the additional item data comprises simultaneously displaying abbreviated item data for each of the additional identifiers; and
receiving feedback that the additional item data corresponds to the desired item comprises receiving a selection of one of the abbreviated item data.

13. The method of claim 8, further comprising:
before receiving the item data from the network, sending information that the device is authorized for the item data, wherein the information includes at least one of:
a location of the plurality of items,
a time when the plurality of identifiers was read,
a type of the item data,
a location of the device,
an identity of the device, and
a user identity associated with the device.

14. A method for an electronic device communicatively coupled to a Radio Frequency Identification (RFID) reader to identify a desired item from among a plurality of items within read range of the RFID reader, the method comprising:
reading, using the RFID reader, a plurality of digital identifiers, each identifier associated with an item in the plurality of items;
selecting, based on a metric including one or more of a proximity or a movement, a first identifier from the plurality of identifiers;
displaying, on a screen of the electronic device, item data received from a network and associated with the first identifier;
receiving feedback that the item data are not associated with the desired item;
selecting, based on the metric, a plurality of other identifiers from the plurality of identifiers;
after determining that the first identifier is not associated with the desired item, displaying on the screen additional item data associated with the other identifiers; and
receiving feedback that one of the other identifiers corresponds to the desired item.

15. The method of claim 14, wherein selecting the first identifier comprises:
determining a respective proximity for each item in the plurality of items based on at least one of a received signal strength indicator (RSSI) and a read count;
determining that a first item in the plurality of items has a closest proximity to the reader;
determining that the first item is associated with the first identifier; and
selecting the first identifier.

16. The method of claim 14, wherein selecting the first identifier comprises:
determining that a first item in the plurality of items is moving toward the reader;
determining that the first item is moving with respect to at least one other item in the plurality of items;
determining that the first item is associated with the first identifier; and
selecting the first identifier.

17. The method of claim 14, wherein selecting the first identifier comprises:
determining a respective proximity for each item in the plurality of items;
determining that at least one item in the plurality of items is moving;
determining that a first item in the plurality of items both has a closest proximity to the reader and is moving;
determining that the first item is associated with the first identifier; and
selecting the first identifier.

18. The method of claim 14, wherein the metric further includes information about previously selected items and/or a user of the device.

19. The method of claim 14, wherein:
displaying the additional item data comprises simultaneously displaying abbreviated item data for each of the other identifiers; and
receiving feedback that the additional item data corresponds to the desired item comprises receiving a selection of one of the abbreviated item data.

20. The method of claim 14, further comprising:
before displaying the item data, determining that the device is authorized for the item data based on at least one of:
a location of the item associated with the first identifier,
a time of selection of the first identifier,
a type of the item data,
a location of the device,
an identity of the device, and
a user identity associated with the device.

* * * * *

UNITED STATES PATENT AND TRADEMARK OFFICE
CERTIFICATE OF CORRECTION

PATENT NO. : 10,546,162 B1
APPLICATION NO. : 16/397116
DATED : January 28, 2020
INVENTOR(S) : Christopher J. Diorio Page 1 of 1

It is certified that error appears in the above-identified patent and that said Letters Patent is hereby corrected as shown below:

In the Specification

In Column 7, Line 49-50, Delete "For example, local".

Signed and Sealed this
Fourth Day of August, 2020

Andrei Iancu
*Director of the United States Patent and Trademark Office*